United States Patent [19]
Leung

[11] Patent Number: 6,024,215
[45] Date of Patent: Feb. 15, 2000

[54] COMPACT DISC CARRIER

[76] Inventor: Chan Sik Leung, Flat F, 2/F, Block 8, Lily Mansion, Site 9, Whampoa Garden, Kowloon, The Hong Kong Special Administrative Region of the People's Republic of China

[21] Appl. No.: 09/347,740

[22] Filed: Jul. 6, 1999

[51] Int. Cl.$^7$ .................................................. B65D 85/57
[52] U.S. Cl. ........................ 206/308.1; 220/824; 220/827
[58] Field of Search ................................ 206/307, 308.1, 206/309, 311, 312, 313, 232; 220/823, 824, 827

[56] References Cited

U.S. PATENT DOCUMENTS

| | | | |
|---|---|---|---|
| 4,778,047 | 10/1988 | Lay | 206/308.1 |
| 5,322,162 | 6/1994 | Meck | 206/308.1 |

*Primary Examiner*—Jacob K. Ackun
*Attorney, Agent, or Firm*—Allen R. Morganstern

[57] ABSTRACT

A portable compact disc carrier is designed to hold a plurality of compact discs. A pair of covers are hinged at a pivot joint on a base bracket, having hollow pins movable therein. Dampening grease is swept on the surface of the pins when they are inserted into integrated cylinder drums on the base bracket. The outer ends of the pins are fixed on the covers. This arrangement restrains the speed of the covers' motion when they are turning open. Two springs are used to pre-load the covers so that they are always in the opening state when they are not hooked up by a latch assembly with a latch button. The button can be turned 90 degrees in the closed state to disable accidental opening of the compact disc carrier. A plurality of disc holding sleeve compartments are also hinged on the base bracket so that they can rotate in a fan-like configuration about an axis parallel to that of the covers. A leaf spring between the disc holders causes half to turn towards one cover and the other half towards the other cover. In the closed state, the disc holders and the discs in them are enclosed between the covers. When the latch button is pressed, the covers turn open in a slow motion style together with the disc holders and the discs they contain. The angle each disc holder will move depends on its interaction with the recesses of an angle limiter. The disc holders and their discs are arranged evenly in an arcuate viewing position.

20 Claims, 3 Drawing Sheets

COMPACT DISC CARRIER

FIELD OF THE INVENTION

The present invention relates to compact disc carriers, which open up automatically in an open position in a smooth slow motion manner.

BACKGROUND OF THE INVENTION

Compact disc holders are consumer items, which hold a plurality of musical or video compact discs in a case having a plurality of sleeve compartments for insertion of a disc within each respective sleeve compartment. Typically, the compact discs are enclosed in a portable carry case for protection during travel. The carry case is then opened and set up by the user at the destination of use. The sleeve compartments are generally like pages in a photograph album, which must be turned separately as they pivot forward, until the appropriate sleeve compartment is reached with the desired compact disc.

Moving the sleeve compartments causes each sleeve compartment to fold down, and then the next sleeve compartment must be turned. The loose turning of the sleeve compartments used on most compact disc carriers does not expose a variety of compact discs simultaneously in an elegant, carefully designed appearance.

OBJECTS OF THE INVENTION

It is therefore an object of the present invention to provide a compact disc carrier, which automatically opens to expose a plurality of compact discs for viewing selection and access therefrom.

It is another object of the present invention to provide a compact disc carrier, which opens itself up automatically with a slow motion action, upon pressing of a button.

It is yet another object of the present invention to provide a plurality of sleeve compartments for compact discs, so that the compact discs can be easily retrieved.

It is yet another object of the present invention to improve over the disadvantages of the prior art.

SUMMARY OF THE INVENTION

In keeping with these objects and others which may become apparent, the present invention includes a compact disc carrier which pivots to an open viewable position to simultaneously expose a plurality of compact disc sleeve compartments. The compact disc carrier opens by a pre-loaded pivot joint base which is tight and precise in operation.

Typically the compact disc carrier has a clamshell configuration which opens itself up automatically in a slow motion action, to expose a fan-like configuration of compact disc sleeve compartments positioned at pre-determined angles off of the vertical axis of the compact disc carrier when it is in an upright, closed position.

When closed, the compact disc carrier includes a pair of adjacent facing covers joined by a pivot joint. While many configurations are possible, preferably the pivot joint includes a pair of wings with convex surfaces about which the concave proximal ends of the covers pivot. This pivot joint is attached to a support bracket, so that together they form a common bottom pivot joint base for the pivoting covers of the compact disc carrier.

In the closed position the two covers are joined at a top distal end by a latch, such as a latch hook. To release the latch and open the compact disc carrier, a latch release button disengages the latch hook, separates the two covers and opens the compact disc carrier to set up for use in retrieving compact discs therefrom.

The disc holding sleeve compartments also pivot at the pivot joint so that they rotate about an axis parallel to that of the two covers, which are joined at the pivot joint base by their respective bottom, proximal ends. When the latch is released, the sleeve compartments open smoothly, while the covers pivot apart from each other.

When setting up the compact disc carrier by opening for use, the compact disc carrier is placed on a horizontal surface, and then the latch release button is pressed inward and released. This releases the latch hook and causes the two covers to separate and swing apart in a slow, smooth motion and open up, with the two covers preferably being laid horizontally at 180 degree apart from each other in a stable position, with the disc holding sleeve compartments arrayed in a fan-like manner therebetween.

To close the compact disc carrier, the two covers are pushed together and then the latch hook holds the covers together. The latch button can be swiveled to a locked position, such as for example, by swiveling 90 degrees off of the latch position, to keep the compact disc carrier closed and to disable accidental openings.

One or more springs aid in the initial deployment of the covers of the compact disc carrier when the latch button is activated. The smooth, slow motion of the opening of the two covers preferably occurs by means of one or more torsion coil springs which urge the two covers of the compact disc carrier and the disc holding sleeve compartments to swing outward and apart. A further spring, such as a leaf spring, is preferably placed at the middle of the sleeve compartments, to urge one half of the disc containing sleeve compartments towards one cover and another half of the sleeve compartments towards the other cover.

Each respective disc holding sleeve compartment reaches a predetermined angle of rest in the open position by means of an angle limiting member attached to the pivot joint base between the two covers. The disc holding sleeve compartments are arranged equally and evenly within respective recesses in the angle limiting member and are spread out over the 180 degrees separating the two covers. This makes replacement of the compact discs from the sleeve compartments very easy, and it can be done in any order while the compact disc carrier is open.

Furthermore, the spring action of the torsion coil springs is muted because each coil spring is attached to a respective rotatable pin located within a respective cylindrical housing drum. The pins rotate in a slow motion as they contact a layer of grease, such as silicone grease, within the respective cylindrical housing drums in which these respective pins rotate. This arrangement restrains the speed of the motion of the two covers when they are turned open by the force of the torsion coil springs.

Therefore, the covers and the disc holding compartments gracefully open in a smooth slow motion to expose the compact discs therein.

BRIEF DESCRIPTION OF THE DRAWINGS

The present invention can best be understood in connection with the accompanying drawings in which.

DETAILED DESCRIPTION OF THE PREFERRED EMBODIMENT

Figure 1:
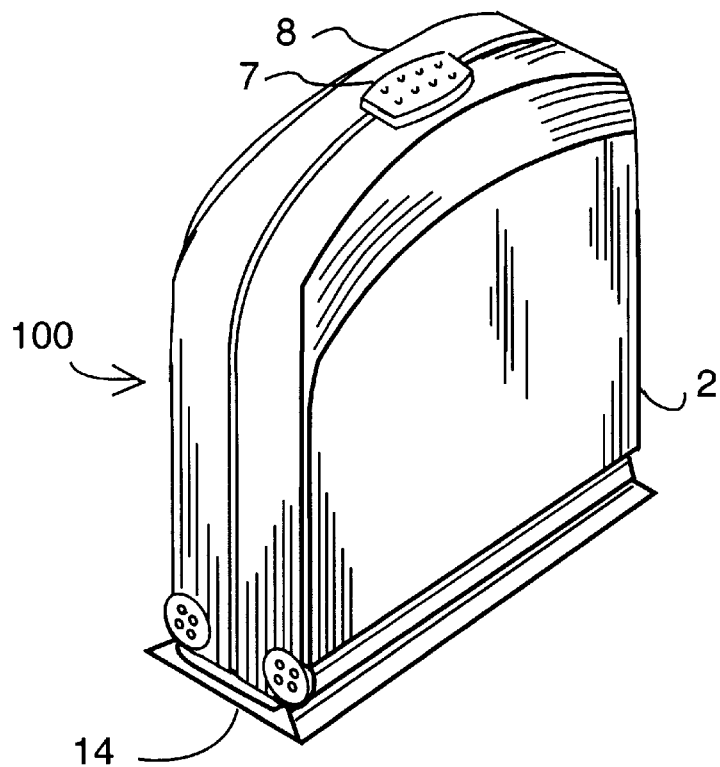
FIG. 1 shows a perspective view of the compact disc carrier of the present invention when closed.
Figure 2:
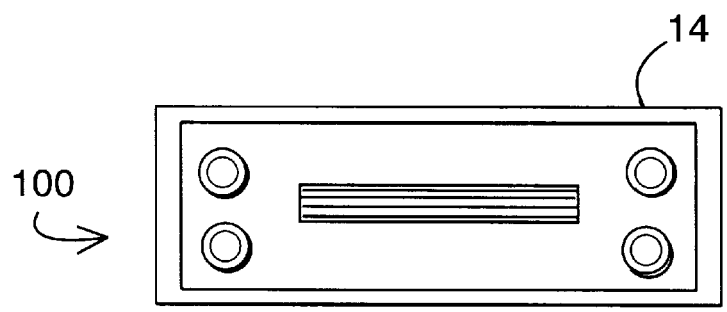
FIG. 2 shows a bottom view of the compact disc carrier thereof when closed.
Figure 3:
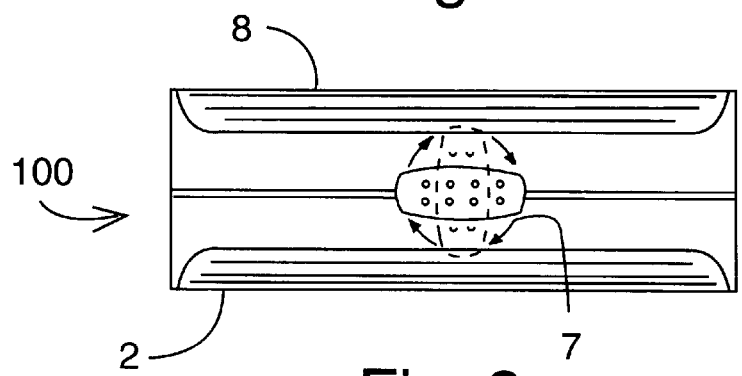
FIG. 3 shows a top plan view of the compact disc carrier thereof when closed.
Figure 4:
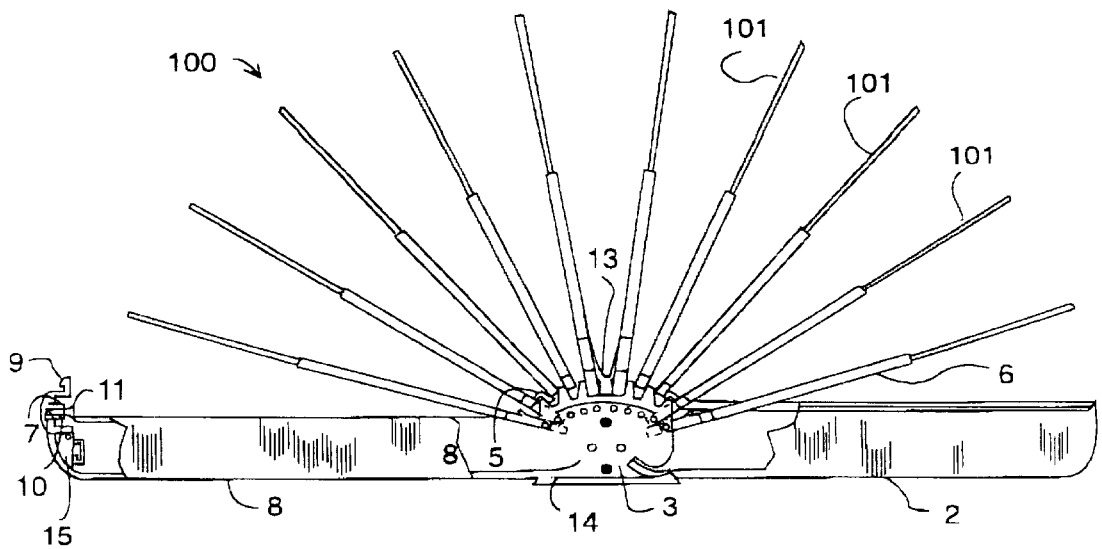
FIG. 4 shows a left side elevational view of the compact disc carrier thereof in a set up, open position.
Figure 5:
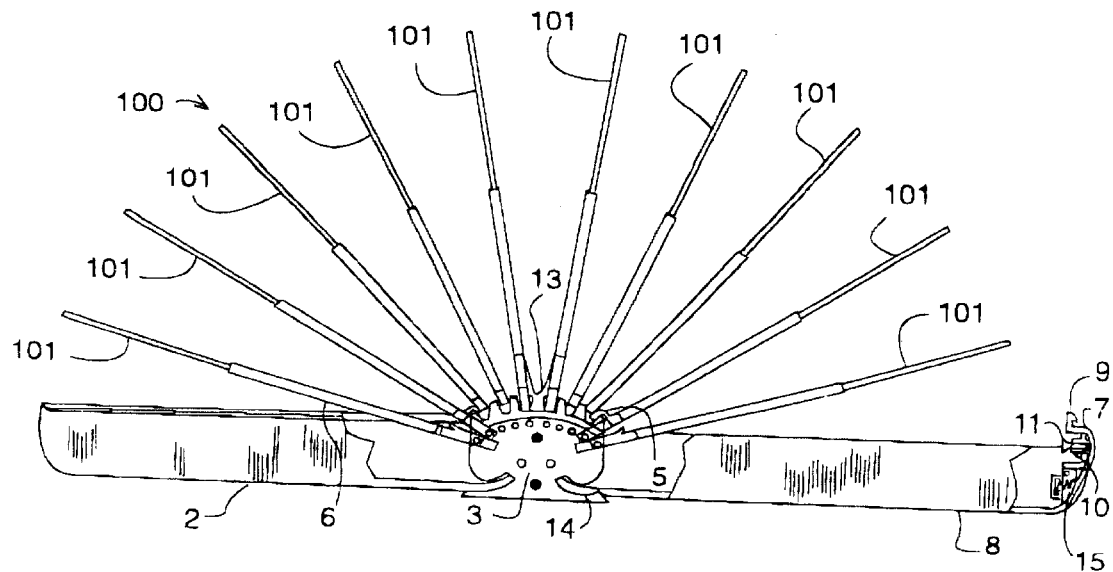
FIG. 5 shows a right side elevational view of the compact disc carrier thereof in a set up, open position; and, FIG. 6 is an exploded perspective exploded view of the components of the compact disc carrier thereof when closed.

While FIGS. 1–3 show three views of compact disc carrier 100 of the present invention when closed, FIGS. 4–5 show compact disc carrier 100 in an open position for viewing compact discs 101 therein.

Compact disc carrier 100 includes front cover 2, rear cover 8, bottom pivot joint base bracket 14 and latch button 7. Front cover 2 and rear cover 8 are pivotable and joined at common proximal edges to pivot joint 3 at bottom pivot joint base bracket 14.

FIGS. 4 and 5 show front and rear elevational views of compact disc carrier 100 when opened for retrieval of compact discs 101 from a plurality of pivotable disc holding sleeve compartments 6, which are also pivotable at angle limiting member 5 at pivot joint 3 of bottom pivot joint base bracket 14. Angle limiting member 5 is a segmented arc with a plurality of respective equidistant wedge-shaped recesses therein. Within each respective recess each respective disc holding sleeve compartment is free to move. Each sleeve compartment 6 rests loosely, to permit each disc holding sleeve compartment 6 to pivot from a substantially vertical position between covers 2 and 8 in the closed position of compact disc carrier 100, to a respective angled viewable position. These disc holding sleeve compartments 6 are arranged in a fan-like configuration in the open, viewable position, for viewing compact discs 101.

Between angle limiting member 5 and bottom pivot joint base bracket 14 is located pivot joint 3, having rounded convex wings on each side, so that rounded concave edges of the lower proximal ends of covers 2 and 8 can pivot thereabout from a closed vertical position to an open, horizontal position 180 degrees apart from each other.

To open compact disc carrier 100 for use in the open fan-like configuration shown in FIGS. 4 and 5, compact disc carrier 100 is placed on a horizontal surface, and then while covers 2 and 8 are held steady in a vertical position, release button 7 is pressed inward and released. Latch button 7 is preferably attached to latch hook 9, which engages under a reciprocating top distal edge of cover 2.

Latch hook 9 at the distal top of cover 8 engages a reciprocating edge of cover 2, during closing. The forward bias force of latch hook 9 keeps these two covers 2 and 8 engaged even if compact disc carrier 100 is lifted for travel. Latch button 7 can be swiveled 90 degrees in the closed state to disable and prevent any accidental openings of compact disc carrier 100 during travel.

When latch button 7 is pressed down against latch spring 15 within ring 10 and against latch pin 11, latch hook 9 is then released from the top distal edge of cover 2, thus separating cover 8 from cover 2. Then, covers 2 and 8 pivot outward away from each other in a slow smooth motion and rest open horizontally, joined by pivot joint 3 at bottom base bracket 14. This movement of covers 2 and 8 occurs silently and automatically, as disc holding sleeve compartments 6 smoothly rotate about an axis parallel to that of covers 2 and 8.

The open position of compact disc carrier 100 is stable, so compact discs 101 within compact disc carrier 100 can be viewed easily, with no chance of compact disc carrier 100 closing inadvertently. To close compact disc carrier 100, covers 2 and 8 are simply pushed in towards each other until they latch closed to each other.

Figure 6:
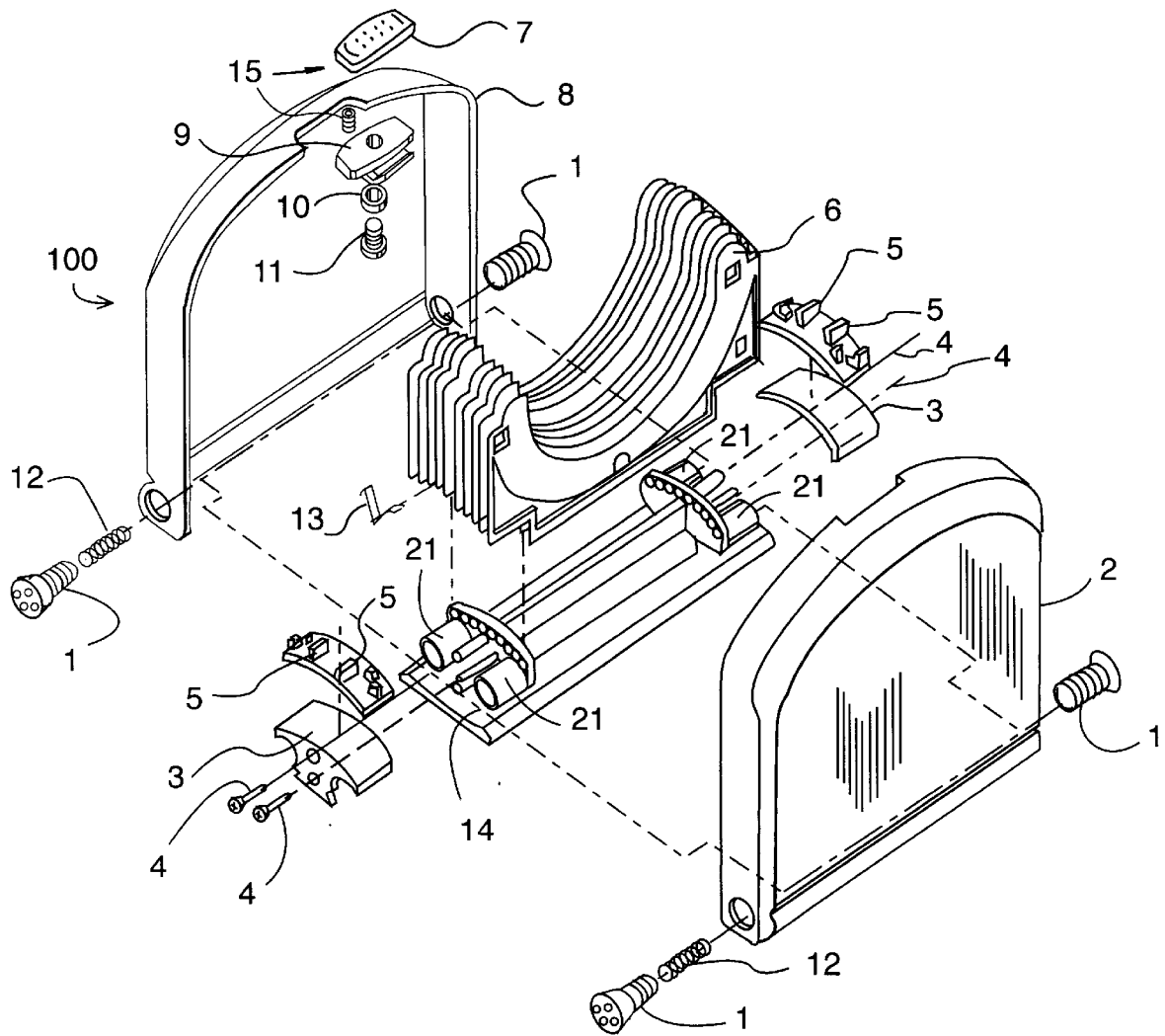

FIG. 6 is an exploded view of compact disc carrier 100. Leaf spring 13 properly biases disc holding sleeve compartments 6 away from each other. Preferably, latch hook 9 insures that compact disc carrier 100 is tight and secure when closed. At least one spring 12, such as coil springs 12, also aids in the initial deployment of covers 2 and 8 of compact disc carrier 100 when latch button 7 is pushed in and activated.

The automatic smooth, slow motion set up of compact disc carrier 100 from a closed position to an open viewable position is powered by the at least one spring 12, such as two torsion coil springs 12, which are torqued during assembly to pre-load covers 2 and 8 and to tend to swing covers 2 and 8 outward from each other.

The inner ends of torsion coil springs 12 engage molded nibs (not shown) attached to at least one bearing recess of pins 1, such as a pair of pins 1 at the sides near the bottom of covers 2 and 8. The outer ends of torsion coil springs 12 engage similar nibs (not shown) inside the closed outer ends of at least one bearing 21, such as a pair of bearing cylinder drums 21, attached to pivot joint base bracket 14. Each pin 1 is respectively rotatable within each respective bearing cylinder drum 21.

The outer ends of pins 1 are fixed to covers 2 and 8 respectively. These pins 1 are captured and restrained from turning within hollow cylindrical drums 21 by latch hook 9 which is part of top cover 8.

Alternatively, a mirror image configuration can be used, where latch hook 9 is part of cover 2 instead, engaging cover 8 (not shown).

A layer of thick, dampening grease, such as silicone grease, fills the respective spaces between bearing pins 1 and bearing cylinder drums 21. The purpose of the dampening grease is to provide a fluid shear counter-torque, which is speed dependent. It is the key ingredient which transforms an otherwise quick, jerky movement of torsion coil springs 12 into the fairly constant smooth slow motion of the opening of compact disc carrier 100.

The action of manually closing compact disc carrier 100 stores energy in torsion coil springs 12, which is then used in the opening or setting-up automatic action, which results in a graceful, smooth, slow motion opening of compact disc carrier 100, to expose compact discs 101 for viewing and retrieval.

It is further noted that other modifications may be made to the present invention without departing from the scope of the invention, as noted in the appended Claims.

I claim:

1. A compact disc carrier to carry a plurality of compact discs therein, comprising:

a pair of covers removably joined at distal ends thereof and pivotable at respective proximal ends about a bottom pivot joint at a base bracket at one edge of said compact disc carrier, said compact disc carrier having a plurality of compact disc carrying sleeve compartments also pivotable about said bottom pivot joint, said disc carrying sleeve compartments being pivotable at respective proximal edges to an open viewable position, exposing respective compact discs therein, to form a fan-like configuration when viewed in cross section;

said compact disc carrier having a spring means urging separation of respective distal ends of said covers upon release of a latch; and, said compact disc carrier further having a dampening means resisting urging of said spring means against said covers of said compact disc carrier.

2. The compact disc carrier as in claim 1 wherein said pair of covers pivot from a vertical closed position to a horizontal open position 180 apart from each other.

3. The compact disc carrier as in claim 1 wherein said compact disc carrying sleeve compartments move apart to a fan-like configuration.

4. The compact disc carrier as in claim 1 wherein said latch comprises a finger operable release button connecting distal ends of said covers together.

5. The compact disc carrier as in claim 1 wherein in a closed position, said covers are joined at said distal ends thereof until a latch hook of said latch latches and connects one cover of said pair of covers with another cover of said pair of covers.

6. The compact disc carrier as in claim 4 wherein said latch is engageable with a latch spring biasing said finger operable release latch button.

7. The compact disc carrier as in claim 4 further comprising at least one spring urging said pair of covers to an open viewable position when said latch button is activated.

8. The compact disc carrier as in claim 7 wherein said at least one spring comprises a plurality of springs.

9. The compact disc carrier as in claim 1 wherein said spring urges separation of said pair of covers from engagement with each other, upon release of said latch, said at least one torsion coil spring being torqued to swing said covers of said compact disc carrier outward upon release of said latch button.

10. The compact disc carrier as in claim 9 wherein an inner end of said at least one torsion coil spring engages at least one pin within a respective bearing cylinder drum and wherein another outer end of said at least one torsion coil spring engages an interior of said at least one bearing cylinder drum, said at least one pin rotatably movable within said at least one bearing cylinder drum.

11. The compact disc carrier as in claim 10 wherein said at least one torsion coil spring comprises a plurality of torsion coil springs within a plurality of corresponding bearing cylinder drums.

12. The compact disc carrier as in claim 1 wherein said dampening means comprises a layer of grease filling a space between said at least one bearing pin and said at least one bearing cylinder drum, said grease providing a fluid shear counter-torque force which is speed dependent, said fluid shear counter-torque force transforming a quick jerky movement of said at least one torsion coil spring into a constant smooth slow motion of said pair of covers of said compact disc carrier upon release of said latch.

13. The compact disc carrier as in claim 9 wherein closing of said compact disc carrier stores energy in said at least one torsion coil spring.

14. The compact disc carrier as in claim 5 wherein said latch is fixed in position by means of a forward bias force of said latch hook of one of said covers engaging against said distal edge of another of said pair of covers.

15. The compact disc carrier as in claim 10 wherein said at least one bearing cylinder drum is integral with said pivot joint base bracket.

16. The compact disc carrier as in claim 10 wherein said at least one pin comprises a plurality of pins and said at least one bearing cylinder drum comprises a plurality of bearing cylinder drums.

17. The compact disc carrier as in claim 1 wherein said disc carrying sleeve compartments are arcuate, said sleeve compartments holding a bottom portion of a respective compact disc therein, thereby exposing a face of said disc for viewing.

18. The compact disc carrier as in claim 1 wherein said plurality of disc carrying sleeve compartments are pivotable within respective recesses of an angle limiting means attached to a pivot joint of said bottom pivot joint base bracket.

19. The compact disc carrier as in claim 18 wherein said angle limiting means is an arcuate member attached to said pivot joint.

20. The compact disc carrier as in claim 18 wherein said pivot joint includes a pair of rounded convex wings engageable with rounded concave edges of lower proximal ends of said pair of covers.

\* \* \* \* \*

UNITED STATES PATENT AND TRADEMARK OFFICE
CERTIFICATE OF CORRECTION

PATENT NO : 6,024,215
DATED : February 15, 2000
INVENTOR(S): Chan Sik Leung

It is certified that error appears in the above-identified patent and that said Letters Patent is hereby corrected as shown below: On the title page, item [75]:

Inventor's name appears as:
   Chan Sik Leung
this name designation should be changed to read as follows:
   Sik Leung Chan Item [19] should read --Chan--.

Signed and Sealed this

Sixth Day of March, 2001

Attest:

NICHOLAS P. GODICI

Attesting Officer        Acting Director of the United States Patent and Trademark Office